United States Patent
Hung

(10) Patent No.: US 12,509,908 B2
(45) Date of Patent: Dec. 30, 2025

(54) METHOD OF MAKING OBJECT INCLUDING COATING UNIT HAVING ANTIBACTERIAL AND ANTIVIRAL ACTIVITY AND OBJECT MADE THEREFROM

(71) Applicant: FIBRE INDUSTRY CO., LTD., Hsinchu (TW)

(72) Inventor: Chen-Yu Hung, Hsinchu (TW)

(73) Assignee: FIBRE INDUSTRY CO., LTD., Hsinchu (TW)

( * ) Notice: Subject to any disclaimer, the term of this patent is extended or adjusted under 35 U.S.C. 154(b) by 231 days.

(21) Appl. No.: 18/347,000

(22) Filed: Jul. 5, 2023

(65) Prior Publication Data

US 2024/0011322 A1 Jan. 11, 2024

(30) Foreign Application Priority Data

Jul. 7, 2022 (TW) ................................. 111125491

(51) Int. Cl.
*E05B 1/00* (2006.01)
*A01N 59/16* (2006.01)
(Continued)

(52) U.S. Cl.
CPC ............ *E05B 1/0069* (2013.01); *A01N 59/16* (2013.01); *A01P 1/00* (2021.08); *A61L 2/232* (2013.01)

(58) Field of Classification Search
CPC ......... E05B 1/0069; B05D 7/24; B05D 7/571; C09D 5/002
See application file for complete search history.

(56) References Cited

U.S. PATENT DOCUMENTS 5,954,190 A * 9/1999 Takahashi .............. A01N 25/34
198/853
2005/0287353 A1* 12/2005 Trogolo ................... B05D 5/00
428/323
(Continued)

FOREIGN PATENT DOCUMENTS

CN 101011634 A * 8/2007
CN 203433569 U 2/2014
(Continued)

OTHER PUBLICATIONS

Search Report appended to an Office Action, which was issued to Taiwanese counterpart application No. 111125491 by the TIPO on Aug. 21, 2023, with an English translation thereof (2 pages).
(Continued)

*Primary Examiner* — Cachet I Proctor
(74) *Attorney, Agent, or Firm* — HSML P.C.

(57) ABSTRACT

A method of making an object including a coating unit having antibacterial and antiviral activity includes (a) providing an untreated object; (b) spraying a primer material onto a surface of the untreated object so as to form a primer coating layer, thereby obtaining a primed object; (c) baking the primed object obtained in step (b) to dry the primer coating layer, thereby obtaining a baked object; (d) spraying a varnish material onto a surface of the baked object obtained in step (c) so as to form a varnish coating layer on the primer coating layer, thereby obtaining a varnished object; and (e) baking the varnished object obtained in step (d) to dry the varnish coating layer, thereby forming a coating unit having the primer coating layer and the varnish coating layer on the surface of the object. An object including an untreated object and a coating unit is also provided.

10 Claims, 2 Drawing Sheets

(51) Int. Cl.
*A01P 1/00* (2006.01)
*A61L 2/232* (2006.01)
*B05D 7/24* (2006.01)
*C09D 5/00* (2006.01)

(56) References Cited

U.S. PATENT DOCUMENTS

| | | | |
|---|---|---|---|
| 2006/0006678 A1* | 1/2006 | Herron | E05B 1/0069 |
| | | | 292/336.3 |
| 2006/0156948 A1* | 7/2006 | Hendriks | B05D 5/00 |
| | | | 106/18.29 |
| 2017/0000115 A1* | 1/2017 | Nassar | C08G 65/33303 |
| 2021/0278343 A1* | 9/2021 | Rosen | H04N 23/56 |

FOREIGN PATENT DOCUMENTS

| | | | | | |
|---|---|---|---|---|---|
| CN | 105293914 | A | * | 2/2016 | |
| CN | 112024333 | A | * | 12/2020 | |
| CN | 112439660 | A | | 3/2021 | |
| GB | 2444128 | A | * | 5/2008 | A61L 2/238 |
| WO | WO-2008040965 | A2 | * | 4/2008 | A61L 2/18 |

OTHER PUBLICATIONS

Search Report appended to an Office Action, which was issued to Chinese counterpart application No. 202310729023.5 by the CNIPA on Jun. 12, 2025, with an English translation thereof.

* cited by examiner

METHOD OF MAKING OBJECT INCLUDING COATING UNIT HAVING ANTIBACTERIAL AND ANTIVIRAL ACTIVITY AND OBJECT MADE THEREFROM

CROSS-REFERENCE TO RELATED APPLICATION

This application claims priority to Taiwanese Invention Patent Application No. 111125491, filed on Jul. 7, 2022.

FIELD

The disclosure relates to a method of making an object and an object made therefrom, and more particularly to a method of making an object having an antibacterial and antiviral coating and an object made therefrom.

BACKGROUND

Door handles are some of the most commonly touched objects in daily lives. In public places, people usually push and pull the door handles with their hands, and therefore are very likely to leave bacteria and virus that are already on their hands on the door handles. Moreover, germs remaining on their hands are likely to be taken back to door handles of their home. Once people touch their noses or mouths with their contaminated hands, they are at high risk of infection.

SUMMARY

Therefore, in a first aspect, the present disclosure provides a method of making an object including a coating unit having antibacterial and antiviral activity, which can alleviate at least one of the drawbacks of the prior art.

The method includes:
(a) providing an untreated object;
(b) spraying a primer material onto a surface of the untreated object using an electrostatic spray gun so as to from a primer coating layer on the surface of the untreated object, thereby obtaining a primed object, the primer coating layer including a primer and a first inorganic additive that contains a silver ion and an inorganic glass composition, the first inorganic additive being present in an amount ranging from 4 wt % to 7 wt % based on 100 wt % of the primer coating layer;
(c) baking the primed object obtained in step (b) to dry the primer coating layer, thereby obtaining a baked object;
(d) spraying a varnish material onto a surface of the baked object obtained in step (c) using a hand spray gun so as to form a varnish coating layer on the primer coating layer, thereby obtaining a varnished object, the varnish coating layer including a varnish and a second inorganic additive that contains a silver ion and an inorganic glass composition, the second inorganic additive being present in an amount ranging from 4 wt % to 7 wt % based on 100 wt % of the varnish coating layer; and
(e) baking the varnished object obtained in step (d) to dry the varnish coating layer, thereby forming a coating unit having the primer coating layer and the vanish coating layer on the surface of the untreated object.

In a second aspect, the present disclosure provides an object which can alleviate at least one of the drawbacks of the prior art. The object includes:
an untreated object; and
a coating unit having a primer coating layer including a primer and a first inorganic additive that contains a silver ion and an inorganic glass composition, and a varnish coating layer including a varnish and a second inorganic additive that contains a silver ion and an inorganic glass composition, and having antibacterial and antiviral activity.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
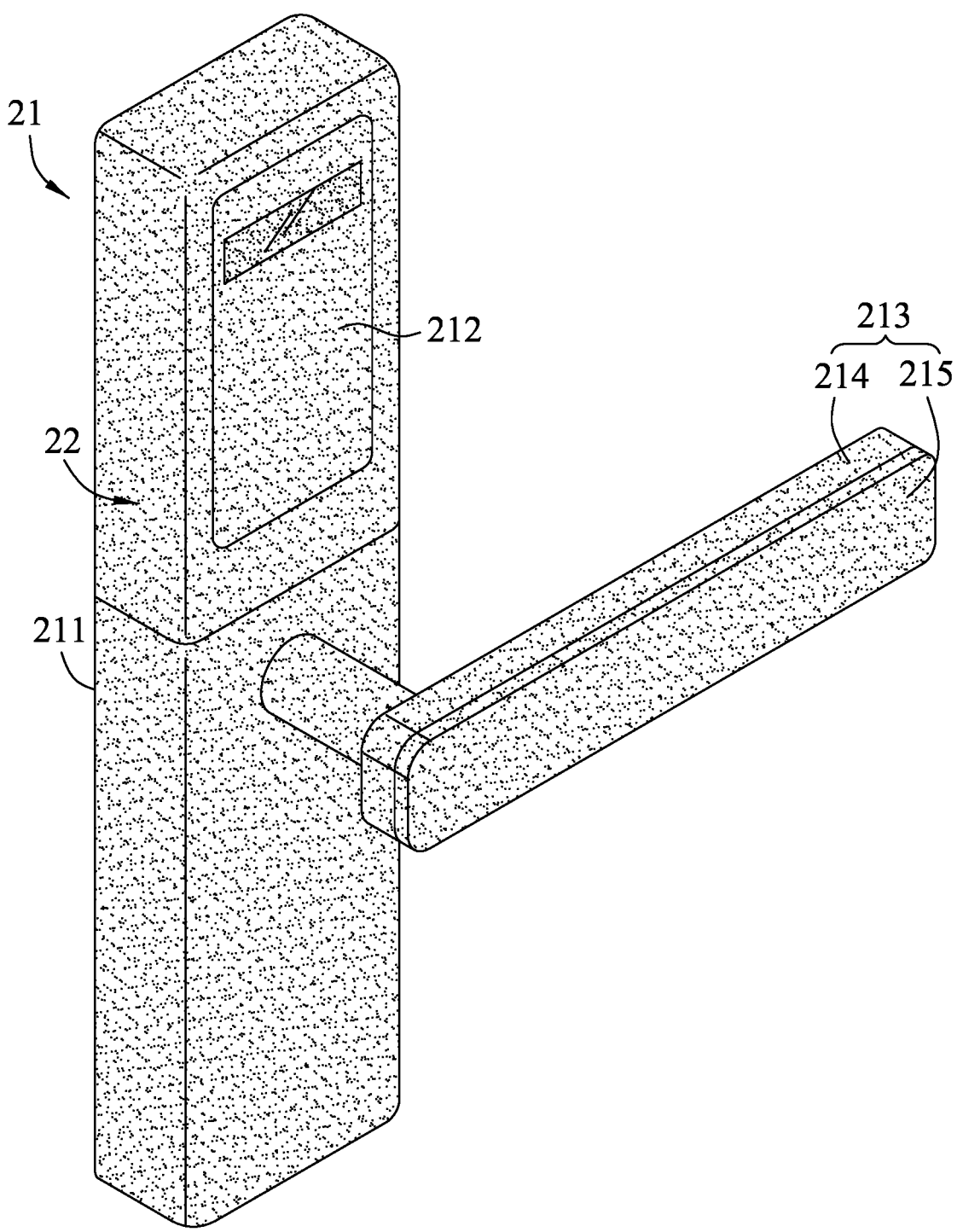
FIG. 1 is a three-dimensional schematic view illustrating an embodiment of a door lock assembly including a coating unit having antibacterial and antiviral activity according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

The present disclosure provides a method of making an object including a coating unit 22 having antibacterial and antiviral activity, which includes:
(a) providing an untreated object;
(b) spraying a primer material onto a surface of the untreated object using an electrostatic spray gun so as to form a primer coating layer 221 on the surface of the untreated object, thereby obtaining a primed object, the primer coating layer 221 including a primer and a first inorganic additive that contains a silver ion and an inorganic glass composition, the first inorganic additive being present in an amount ranging from 4 wt % to 7 wt % based on 100 wt % of the primer coating layer 221;
(c) baking the primed object obtained in step (b) to dry the primer coating layer 221, thereby obtaining a baked object;
(d) spraying a varnish material onto a surface of the baked object obtained in step (c) using a hand spray gun so as to form a varnish coating layer 222 on the primer coating layer 221, thereby obtained a varnished object, the varnish coating layer 222 including a varnish and a second inorganic additive that contains a silver ion and an inorganic glass composition, the second inorganic additive being present in an amount ranging from 4 wt % to 7 wt % based on 100 wt % of the varnish coating layer 222; and
(e) baking the varnished object obtained in step (d) to dry the varnish coating layer 222, thereby forming the coating unit 22 having the primer coating layer 221 and the varnish coating layer 222 on the surface of the untreated object.

The present disclosure also provides an object including an untreated object and a coating unit 22 having a primer coating layer 221 including a primer and a fist inorganic additive that contains a silver ion and an inorganic glass composition, and a varnish coating layer 222 including a varnish and a second inorganic additive that contains a silver ion and an inorganic glass composition, and having antibacterial and antiviral activity.

Figure 2:
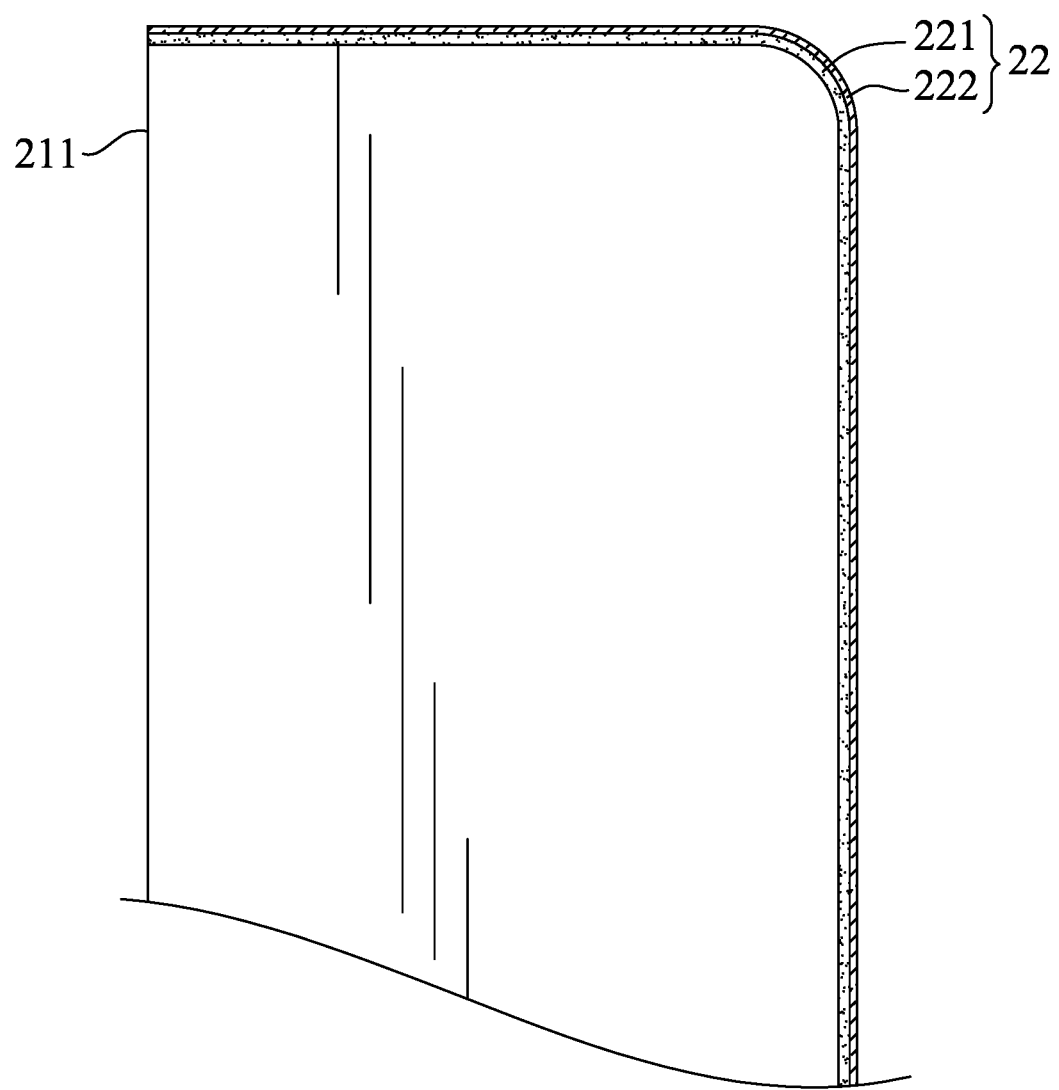
FIG. 2 is a cross-sectional schematic view illustrating the coating unit of FIG. 1.

Referring to FIGS. 1 and 2, an embodiment of the object including the coating unit 22 having the antibacterial and antiviral activity according to the present disclosure is illustrated by taking a door lock apparatus, which has a door lock assembly 21 and the aforesaid coating unit 22 coated thereon, as an example. However, examples of the object are not limited thereto. In addition, examples of the door lock assembly 21 may be a conventional door lock or an electronic door lock.

In certain embodiments, the door lock assembly 21 may include a lock case 211 and a handle 213 secured to the lock case 211. In certain embodiments, the door lock assembly 21, in addition to the lock case 211 and the handle 213, may further include a touch cover 212 covering part of the lock case 211. Moreover, the handle 213 is spaced apart from the touch cover 212, and includes a handle grip 214 rotatably and pivotally secured to the lock case 211 and an outer sheet 215 secured to the handle grip 214. The outer sheet 215 is located distantly from the lock case 211.

In certain embodiments, the lock case 211 may be made of a metal or an alloy, the touch cover 212 may be made of glass, the handle grip 214 may be made of a metal or an alloy, and the outer sheet 215 may be made of a plastic. In this embodiment, each of the lock case 211 and the handle grip 214 is made of an alloy, and the touch cover 212 has a periphery enclosed by a plastic frame and is secured to the lock case 211.

It should be noted that lock mechanisms installed in the lock case 211, electrical control modules installed in the lock case 211 corresponding to the location of the touch cover 212, and other like components, are not crucial to the present disclosure and will not be described in further detail herein.

In certain embodiments, the coating unit 22 may be coated on a surface of the lock case 211, a surface of the touch cover 212, and a surface of the handle 213. That is to say, the coating unit 22 having the primer coating layer 221 and the varnish coating layer 222 is formed on the surface of the door lock assembly 21. More specifically, the primer coating layer 221 is formed on a surface of the door lock assembly 21, and the varnish coating layer 222 is formed on a surface of the primer coating layer 221 opposite to the door lock assembly 21. In this embodiment, the primer coating layer 221 and the varnish coating layer 222 include the first inorganic additive and the second inorganic additive, respectively, and each of the first inorganic additive and the second inorganic additive has the antibacterial and antiviral activity due to containing the silver ion and the inorganic glass composition. In an exemplary embodiment, the inorganic glass composition in each of the first inorganic additive and the second inorganic additive is a phosphate glass composition.

The primer coating layer 221 includes the primer and the first inorganic additive, and the first inorganic additive is present in an amount ranging from 4 wt % to 7 wt % based on 100 wt % of the primer coating layer 221. In this embodiment, the primer utilizing in the primer coating layer 211 is illustrated by taking FP1850-BLACK (G16-15R) as an example.

The varnish coating layer 222 includes the varnish and the second inorganic additive, and the second inorganic additive is present in an amount ranging from 4 wt % to 7 wt % based on 100 wt % of the varnish coating layer 222. In this embodiment, the varnish is illustrated by taking a transparent varnish mainly comprising polymer resin as an example.

By adjusting content of each of the first inorganic additive in the primer coating layer 221 and the second inorganic additive in the varnish coating layer 222 to be greater than or equal to 4 wt %, and by having each of the first and second inorganic additives containing the silver ion and the inorganic glass composition, the primer coating layer 221 and the varnish coating layer 222 may have the antibacterial and antiviral activity. Moreover, making the content of the each of the first inorganic additive in the primer coating layer 221 and the second inorganic additive in the varnish coating layer 222 not greater than 7 wt % may effectively assist solubility of the first and second inorganic additives in the primer and the vanish, respectively. Furthermore, the inorganic glass composition in each of the first and second inorganic additives may help to prevent the coating unit 22 from being atomized caused by addition of the silver ion.

It should be noted that by utilizing the inorganic glass composition in each of the first and second inorganic additives and by cooperating with the varnish coating layer 222, the coating unit 22 may be attached to the surface of the door lock assembly 21 permanently and durably. In addition, by adopting the inorganic glass composition in each of the first and second inorganic additives, not only atomization may be prevented, but the antibacterial and antiviral activity of the coating unit 22 may last longer. In contrast, even though the organic materials currently being used may have better adhesion, their antimicrobial properties last merely six months or shorter, resulting in loss of antimicrobial effect.

A method of making the aforesaid door lock apparatus including the door lock assembly 21 and the coating unit 22 is described as follows.

Before forming the primer coating layer 221 by spraying a primer material onto a surface of a door lock assembly 21, the door lock assembly 21 is initially subjected to a pre-treatment for polishing and sandblasting the surface thereof to increase the surface roughness of the door lock assembly 21, thereby enhancing the coating adhesion of the door lock assembly 21, followed by an ultrasonic treatment accompanying with certain potion(s) to remove surface stains.

After that, the primer is added with the first inorganic additive containing the silver ion and the inorganic glass composition to obtain the primer material. Specifically, the first inorganic additive is present in an amount ranging from 4 wt % to 7 wt % based on 100 wt % of the primer material. Next, by spraying the primer material onto the surface of the door lock assembly 21 using the electrostatic spray gun, the primer coating layer 221 is formed on the surface of the door lock assembly 21, thereby obtaining a primed door lock assembly.

In certain embodiments, the electrostatic spray gun may be moved at a constant speed with a spraying pressure ranging from 0.25 Mpa to 0.65 Mpa during forming of the primer coating layer 221. In this embodiments, the spraying pressure is within the range of 0.35±0.1 Mpa. By regulating the range of the spraying pressure, and by adjusting the content of the first inorganic additive to be ranging from 4 wt % to 7 wt % based on 100 wt % of the primer material, the primer coating layer 221 may be evenly and firmly formed and attached to the door lock assembly 21, thereby exhibiting antibacterial and antiviral effect.

Subsequently, the primed door lock assembly with the primer coating layer 221 is placed in an oven and then baked at 150° C. for 80 minutes, so as to dry the primer coating layer 221, thereby obtaining a baked door lock assembly.

Thereafter, by spraying a varnish material onto a surface of the baked door lock assembly using the hand spray gun and under a spraying pressure ranging from 0.35 Mpa to 0.65 Mpa, the varnish coating layer 222 is formed on the primer coating layer 221, thereby obtaining a varnished door lock assembly. Specifically, the varnish coating layer 222 includes the varnish and the second inorganic additive, and the second inorganic additive is present in an amount ranging from 4 wt % to 7 wt % based on 100 wt % of the varnish coating layer 222.

It should be noted that a colored paint layer may be coated on the primer coating layer 221 by spaying, as desired, prior to forming of the varnish coating layer 222. By this way, a colored door lock assembly may be obtained. In this embodiment, in formation of the colored paint layer, a hand spray gun with a spraying pressure ranging from 0.35 Mpa to 0.65 Mpa is used. After spraying is completed, the colored door lock assembly is placed in an oven and then baked at 110° C. for 75 minutes. It should be clarified that, the coating unit 22 shown in FIG. 2 contains merely the primer coating layer 221 and the varnish coating layer 222.

After the forming of the varnish coating layer 222, the varnished door lock assembly with the primer coating layer 221 and the varnish coating layer 222 is placed in an oven and then baked at 110° C. for 75 minutes, so as to dry the varnish coating layer 222. It should be understood that the abovementioned coating process for forming the primer coating layer 221 and varnish coating layer 22, both of which serve as the coating unit 22 having the antibacterial and antiviral activity, is not limited to application to the door lock assembly 21, as long as a certain object is capable of being coated with the primer coating layer 221 and subsequently the varnish coating layer 222. Therefore, the abovementioned coating process may be applied to various items that need to be coated, such as a metal item and a plastic item.

In sum, by adding the first inorganic additive and the second inorganic additive, each of which has the silver ion and the inorganic glass composition, and by adjusting the content of each of the first and second inorganic additives to be present in the amount ranging from 4 wt % to 7 wt % based on 100 wt % of the primer coating layer 221 and the varnish coating layer 222, respectively, the coating unit 22 (i.e., the primer coating layer 221 and the varnish coating layer 222 as a whole) of the door lock apparatus made by using the method according to the present disclosure may not only achieve antibacterial and antiviral effect, but also be attached to the door lock assembly 21 firmly by virtue of regulating some spraying parameters such as spraying pressure. Furthermore, the addition of the inorganic glass composition in each of the first and second inorganic additives may help to prevent the primer coating layer 221 and the varnish coating layer 22 from being atomized caused by the silver ion, when being coated on the door lock assembly 21, thereby achieving the goal of the present disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of making an object including a coating unit having antibacterial and antiviral activity, comprising:
   (a) providing an untreated object;
   (b) spraying a primer material onto a surface of the untreated object using an electrostatic spray gun so as to form a primer coating layer on the surface of the untreated object, thereby obtaining a primed object, the primer coating layer including a primer and a first inorganic additive that contains a silver ion and an inorganic glass composition, the first inorganic additive being present in an amount ranging from 4 wt % to 7 wt % based on 100 wt % of the primer coating layer;
   (c) baking the primed object obtained in step (b) to dry the primer coating layer, thereby obtaining a baked object;
   (d) spraying a varnish material onto a surface of the baked object obtained in step (c) using a hand spray gun so as to form a varnish coating layer on the primer coating layer, thereby obtaining a varnished object, the varnish coating layer including a varnish and a second inorganic additive that contains a silver ion and an inorganic glass composition, the second inorganic additive being present in an amount ranging from 4 wt % to 7 wt % based on 100 wt % of the varnish coating layer; and
   (e) baking the varnished object obtained in step (d) to dry the varnish coating layer, thereby forming the coating unit having the primer coating layer and the varnish coating layer on the surface of the untreated object.

2. The method as claimed in claim 1, wherein the untreated object provided in step (a) is a door lock assembly including a lock case and a handle secured to the lock case.

3. The method as claimed in claim 1, wherein the inorganic glass composition in each of the first inorganic additive and the second inorganic additive is a phosphate glass composition.

4. The method as claimed in claim 2, wherein the electrostatic spray gun is moved at a constant speed with a spraying pressure ranging from 0.25 Mpa to 0.65 Mpa during forming of the primer coating layer.

5. An object, comprising:
an untreated object; and
a coating unit having a primer coating layer including a primer and a first inorganic additive that contains a silver ion and an inorganic glass composition, and a varnish coating layer including a varnish and a second inorganic additive that contains a silver ion and an inorganic glass composition, and having antibacterial and antiviral activity,
wherein the untreated object is a door lock assembly including a lock case and a handle secured to the lock case.

6. The object as claimed in claim 5, wherein the inorganic glass composition in each of the first inorganic additive and the second inorganic additive is a phosphate glass composition.

7. The object as claimed in claim 5, wherein the door lock assembly further includes a touch cover covering part of the lock case, the handle being spaced apart from the touch cover, and including a handle grip rotatably and pivotally secured to the lock case and an outer sheet secured to the handle grip.

8. The object as claimed in claim 7, wherein the coating unit is coated on a surface of the lock case, a surface of the touch cover, and a surface of the handle.

9. The object as claimed in claim 7, wherein the lock case is made of a metal or an alloy, the touch cover is made of glass, the handle grip is made of a metal or an alloy, and the outer sheet is made of a plastic.

10. An object, comprising:
an untreated object; and
a coating unit having a primer coating layer including a primer and a first inorganic additive that contains a silver ion and an inorganic glass composition, and a varnish coating layer including a varnish and a second inorganic additive that contains a silver ion and an inorganic glass composition, and having antibacterial and antiviral activity,
wherein the inorganic glass composition in each of the first inorganic additive and the second inorganic additive is a phosphate glass composition.

* * * * *